April 15, 1930.  F. STONE  1,754,777
SUNSHADE FOR VEHICLES
Filed Aug. 24, 1925
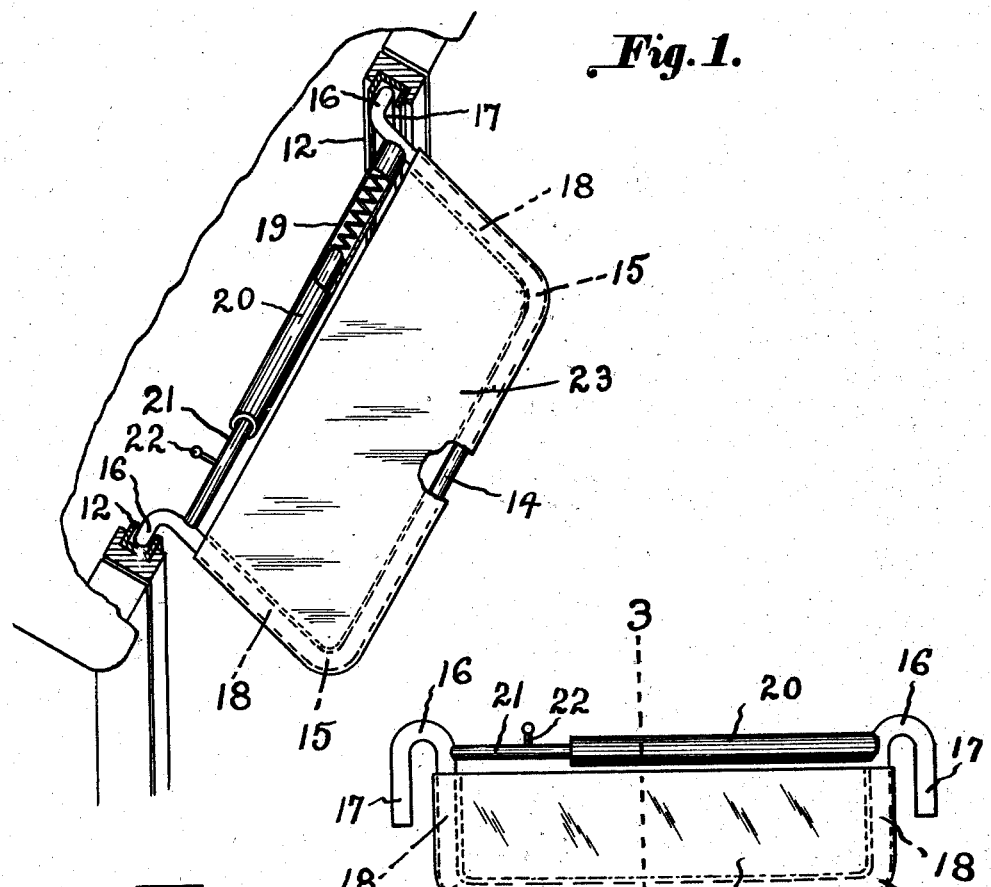
Fig.1.
Fig.2.
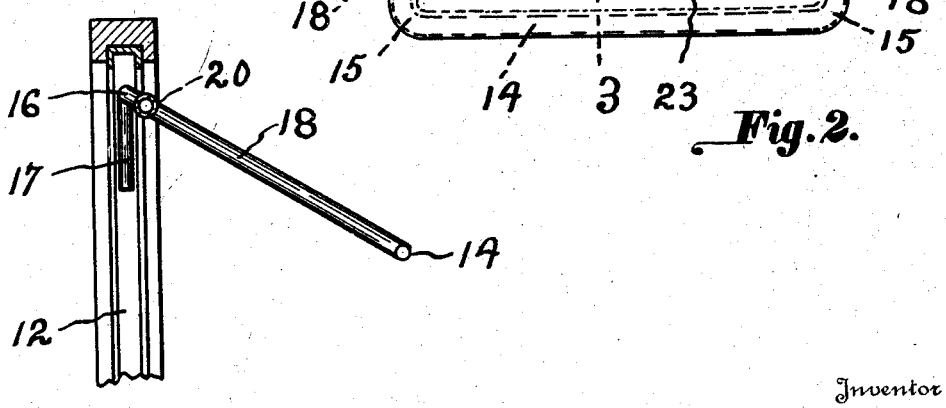
Fig.3.
Inventor
Fred Stone.
By Arthur H. Sturges
Attorney Patented Apr. 15, 1930

1,754,777

UNITED STATES PATENT OFFICE

FRED STONE, OF GLADEWATER, TEXAS

SUNSHADE FOR VEHICLES

Application filed August 24, 1925. Serial No. 51,977.

The present invention relates to improvements in sun shades for vehicles and has for an object to provide an improved visor particularly adapted for use upon the sides of automobiles especially of the closed type.

Another object of the invention is to provide a shade or visor for protecting the driver and occupants of the car from the rays of the sun while also adapted to shed a light rain without requiring that the windows be closed.

A further object of the invention resides in providing an inexpensive, light and compact device that admits of installation in connection with the usual channel construction of the window frames and may be readily removed therefrom.

Other objects of the invention will be apparent from the following description of the preferred form of the invention taken in connection with the accompanying drawings, wherein:—

Fig. 1 is a perspective view of the improved shade or visor, with parts broken away, as applied to a vehicle partly illustrated in section;

Fig. 2 is a plan view of the device; and

Fig. 3 is a central section taken on the line 3—3 in Fig. 2 with the vehicle window frame shown partly in elevation and partly in section.

Referring more particularly to the drawings, the device comprises generally a flexible frame 14 bent substantially U-shape and having stretched thereover the fabric cover 23. The frame 14 is preferably of round cross section and of resilient metal and the fabric is formed into a casing and stitched about the outer and side members of the frame. The free ends of the side members 18 of the frame are bent outwardly, as indicated at 16, to engage in the channel irons 12 within which the glass windows or panels are adapted to have vertical sliding movement. The channel irons 12 are closed at the top as shown in Fig. 3 and being open at the bottom, thus permitting the panels to slide up and down therein. Beyond the outturned terminals 16 are the down-turned extremities 17 arranged to fit in the channel irons 12 and to bind frictionally or resiliently therein whereby the visor may be held in place without additional fastenings. The arms 18 may spring outwardly and bind in the bases of the channel irons by reason of the inherent elasticity in the metal. This elasticity will take effect from the corner portions 15 of the frame.

In addition, the force of a coil spring 19 is utilized to expand the free ends of the side members or arms 18. The coil spring is housed in a cylindrical socket 20 carried by one of the arms 18. The socket is disposed approximately parallel with the outer frame member 14 and is adapted to receive the plunger rod 21 affixed to the opposite side frame member. The inner end of the plunger 21 engages the adjacent end of the coil spring. The other end of the coil spring is secured if desired to the side frame member. The spring is an expanding spring which acts on the plunger and on the adjoining side frame member to cause separation of the two ends 16. A hand piece 22 may be provided on the outer portion of the plunger 21 to enable it to be grasped and the spring 19 compressed. The angle at which the bearing extremities 17 are bent is preferably 30° as this gives the necessary cant to the visor or shade. It is apparent that it may be bent at any approximate angle and this angle may be changed from time to time because of the resilient and yieldable character of the metal.

If desired, the arms or side members may be biased to a position close together instead of spread apart. This will facilitate the attachment of the device to the door or window frame. Under these circumstances, the distance between the legs or bearing extremities 17 will be less than the distance between the channel 12 and one side of the door and its mate channel and the other side of the door.

In use of the device the installation is made by compressing the spring 19 and the bearing ends of the arms 18 whereby these bearing members will clear the sides of the channel irons 12. When released the spring 19 will expand the bearing extremities 17 and these extremities will preferably be of a size to fit rather snugly in the channels in order to avoid rotation about a horizontal axis. The device may be installed at any elevation and may be moved up and down as dictated by the position of the sun at any particular time.

When not in use the device may be stored beneath the back seat of the vehicle or in other available space and one of the devices may be provided for each of the windows.

The device will furthermore be of use in shielding the eyes of the driver from the glare of approaching headlights at night.

I have shown and described a preferred and satisfactory construction but it is obvious that changes may be made in the size, form and proportions of the parts without in any way changing the nature of the invention. I reserve the right to make all such changes as fall within the scope of the following claims.

I claim:

1. As a new product of manufacture, an awning for automobiles comprising a U-shaped wire frame, the end portions of the arms directed laterally outwardly and the extremities directed downwardly at right angles to said lateral portions and at a substantially acute angle to the major portions of said arms, said extremities being resilient, a connecting strip between the arms adjacent the lateral bends, and a covering for said frame, said covering being connected at its ends with said arms and along one longitudinal side with the bight portion of the frame.

2. A visor including a U-shaped frame having resilient side members, adapted to engage the window channels of a vehicle, and means for expanding the ends of the frame into the channels.

3. A visor including a frame having resilient side members, a fabric secured to said frame, bearing members carried by the side members, and means for urging said bearing members away from each other.

4. A visor including a frame having resilient side members, an extensible telescoping sleeve and plunger secured to said side members near the free ends thereof, resilient means beneath the plunger for urging said side members apart, bearing members carried by said side members and a cover stretched over the frame.

5. A visor comprising a substantially rectangular frame opened at one side, a plunger and socket adapted to connect said frame at its open side, a coil spring beneath the plunger and socket, outturned ends on said frame, and bearing extremities turned down angularly from said outturned ends.

FRED STONE.